United States Patent [19]

Nunes et al.

[11] Patent Number: 5,484,152

[45] Date of Patent: Jan. 16, 1996

[54] RECUMBENT TRICYCLE APPARATUS WITH DIFFERENTIAL BRAKE STEERING

[76] Inventors: James A. Nunes, 375 Sunset, Oak View, Calif. 93022; Michael G. Cowan, 311 N. Sprucewood Ave., Oak Park, Calif. 91301

[21] Appl. No.: 264,984

[22] Filed: Jun. 24, 1994

[51] Int. Cl.$^6$ .............................. B62K 5/04; B62K 5/08
[52] U.S. Cl. ...................... 280/282; 280/264; 280/288.1
[58] Field of Search ................................ 280/282, 288.1, 280/274, 270, 62, 264

[56] References Cited

U.S. PATENT DOCUMENTS

| | | | |
|---|---|---|---|
| 4,408,776 | 10/1983 | Randolph et al. | 280/282 X |
| 4,826,190 | 5/1989 | Hartmann | 280/282 X |
| 4,925,202 | 5/1990 | Barker | 280/282 X |
| 5,263,732 | 11/1993 | Harmeyer | 280/282 X |

Primary Examiner—Kevin Hurley

[57] ABSTRACT

A recumbent tricycle with differential brake steering providing enhanced performance and a controllable maneuverability for use as a recreational or short-ranged commuter vehicle. The vehicle is suited to peddle power and in the alternative; small gasoline, electric or alternate fuel engine drive. This invention discloses two parallel forward leading wheels combing the braking and steering functions through the application of a differential mechanism in the drive axle. Manual brake handles on each side of the operator seat are used to brake and to steer through braking. A single caster wheel trails and has an operator controlled maneuverability dampening devise. Application of a single brake will cause the tricycle to rapidly pivot about the braked wheel without loss of energy and without the need to reduce speed to maintain stability.

4 Claims, 3 Drawing Sheets

RECUMBENT TRICYCLE APPARATUS WITH DIFFERENTIAL BRAKE STEERING

BACKGROUND OF INVENTION

1. Field of Invention

The field of invention relates to recumbent tricycles. Our invention applies to recumbent tricycles which are either manually propelled by the vehicle operator or by the application of external power either as a primary driving force or as a secondary source of power assistance on demand. The value of our invention is in enhancing the performance of the tricycle While the nature of the tricycle and its operating characteristics, as derived from our invention, maximize the innovation to the performance and operating characteristics; our invention is equally useable on quadracycle apparatus which can similarly be either operator propelled or propelled in whole or in part by external power.

2. Description of the Prior Art

Various recumbent tricycle apparatus of various configurations have been utilized in the prior art. The most common tricycle configuration uses two wheels in contact with the ground to push a forward single or plural wheel, also in contact with the ground, to steer the apparatus in the general direction established by pointing the leading steering wheels. Where the prior art deviates from a single or plural forward steerable wheel, none apply only a single differential to the leading drive wheels as the primary steering for the apparatus. In the prior art that attempts to use the individual drive wheels for steering, clutch and differential-clutch mechanisms or drive belt slippage are the principle operators for steering.

Tricycles have been used for many years. They have generally consisted of two wheels to the rear with a single steering wheel to the front. This configuration while satisfactory for small children is inherently unstable if speed or fast turning is involved. U.S. Pat. No. 4,826,190 to Hartman dated May, 1989 is an attempt to increase stability by extending and lowering the tricycle frame, however this design sacrifices turning radius and would requires a large area to maneuver. U.S. Pat. No. 4,925,202 to Baker May, 15, 1990 reversed the arrangement of the wheel and used only one of the two front wheels to drive with, the other front wheel is used to brake with, and the rear wheel is the steering mechanism. While this configuration is more maneuverable, the one sided braking and driving of the front wheels limit the stability. Foreign Patent with U.S. Pat. No. 5,071,150 by Conrad Dec. 10, 1991 is an attempt to increase maneuverability but at the expense of added unnecessary weight in the form of a counter weight used to help lift the front wheel off the ground so rear brakes can be used to pivot the tricycle in a short radius. Foreign Patent U.S. Pat. No. 4,484,646 by Smith Nov. 27, 1984 has a low center of gravity and is maneuverable but its drive mechanism would only be effective if used in conjunction with a motor.

Our invention's novelty resides in the organization of the drive wheels in relationship to the forward direction of the apparatus' motion, combines plural drive wheels with the steering and braking functions, utilizes a recumbent operator position, applies a low center of gravity with the center of inertia positioned sufficiently low to maximize the shortness of the apparatus' turning radius without sacrificing stability or requiring a reduction in speed. The novel combination of these parameters results in an unusually comfortable, stable, and extremely maneuverable riding characteristic in our invention, which is achieved because the direct mechanical link between the power and driving mechanisms is continuous. In addition to the novel combination and organization referred to above, a simple friction based dampening device is added to the trailing caster wheel to compensate for varying degrees of operator skill and for changes in driving condition or driving environment for which a infinitely variable steering sensitivity would be of advantage to the operator and which can be employed and adjusted by the operator while operating the apparatus.

As such, it may be appreciated that there be a need for a new and improved tricycle apparatus as set forth in the instant invention wherein the innovative organization of tricycle components and the unique application of mechanisms provided by the instant invention addresses the ease and comfort of use, fun of operation, enhanced maneuverability and operating stability in a novel invention with a broad application to satisfy a diverse range of users, from youth to senior. Our invention substantially fulfills these needs and deviates from prior art by not disengaging the mechanical link between the source of input power and the driving wheels as in a clutch, nor by reliance on an imprecise and difficult to maintain inefficiency, as in the case of slipping drive belts on each drive wheel, and by allowing for control of steering responsiveness in an inherently stabile apparatus.

SUMMARY OF THE INVENTION

The recumbent tricycle apparatus' novel operating characteristics include an extraordinarily high maneuverability with an equally high maintained stability. The novel operating characteristics of the tricycle apparatus are the result of our invention's unique application of a simple low cost differential and an innovative organization of parts.

The tricycle operator sits in a recumbent position slightly behind and above the forward drive axles and powers the tricycle through a bicycle bell crank. Power is in turn transmitted by linked bicycle chain to a sprocket which in turn transmits power to the differential to two drive axles below the operator's seat. The two drive wheels fixed on the two drive axles, respectively, are in contact with the ground and provide motivation to the tricycle apparatus. The organization of the apparatus is such that the two drive wheels precede the operator and a third caster wheel when in forward motion.

The two drive axles are connected in and through a differential upon which the drive sprocket is fixed. A third smaller wheel is positioned to trail the two drive wheels as a caster wheel for stability. The caster wheel is located behind the driver on a center-line axis perpendicular to the drive axles. Mounted on the tricycle frame and straddling each of the drive wheels is a friction brake. Steering is accomplished by selective brake pressure applied with unequal force to each of the two drive wheels. Unequal brake pressure causes the differential to transmit a corresponding increase in speed to the wheel with the lesser braking drag to compensate for the reduced speed in the wheel receiving the higher drag pressure from the brake. Application of full and equal force to the two brakes will cause the tricycle to stop.

The braking mechanism results in a novel steering capability permitted by the inventive use of a differential mechanism. This unique organization allows the tricycle apparatus to turn on and about the braked wheel on a pivot defined by the point of contact between the ground and the braked wheel. This turning radius can be infinitely reduced to zero, or a straight line, by a proportionate decrease in the differential drag applied to each of the two driving wheels. Equal pressure or no pressure on each of the drive wheels will cause the apparatus to move or brake in a straight line.

The unique organization of the tricycle components, recumbent operation, and positioning of the center of gravity with regard to the two drive wheels and the caster wheel imparts a novel steering flexibility. This allows the tricycle to turn sharply about the braked wheel. The center of gravity being low and near the pivoting axis permits this rapid turn while maintaining very high stability, solid all wheel contact with the ground.

A drag device built into the caster wheel support structure adjusts the sensitivity of the tricycle to maneuverability resulting from the utilization of the brakes on the drive wheels for steering. This drag device is a simple application of friction to the caster wheel fork at the point where it pivots in the main frame. This provides a simple and infinite adjustment to the steering sensitivity which the tricycle operator can apply as the tricycle is in operation. This allows adjusting the steering sensitivity to each individual drivers skills and to allow each operator to adjust the steering sensitivity to current environmental condition, such as, motor vehicle or pedestrian traffic intensity.

Our invention resides not in any one of these features per se, but rather in the particular combination of all of them, disclosed herein, and claimed and it is distinguished from the prior art in this particular organization of all of its structures.

BRIEF DESCRIPTION OF THE DRAWINGS

This invention will be better understood and the characteristics distinguishes it from prior art as a novel apparatus in the following detailed description of the various objects and organization and operation thereof. Such detailed description will make reference to the annexed drawings wherein.

DETAILED DESCRIPTION OF THE INVENTION

Figure 1:
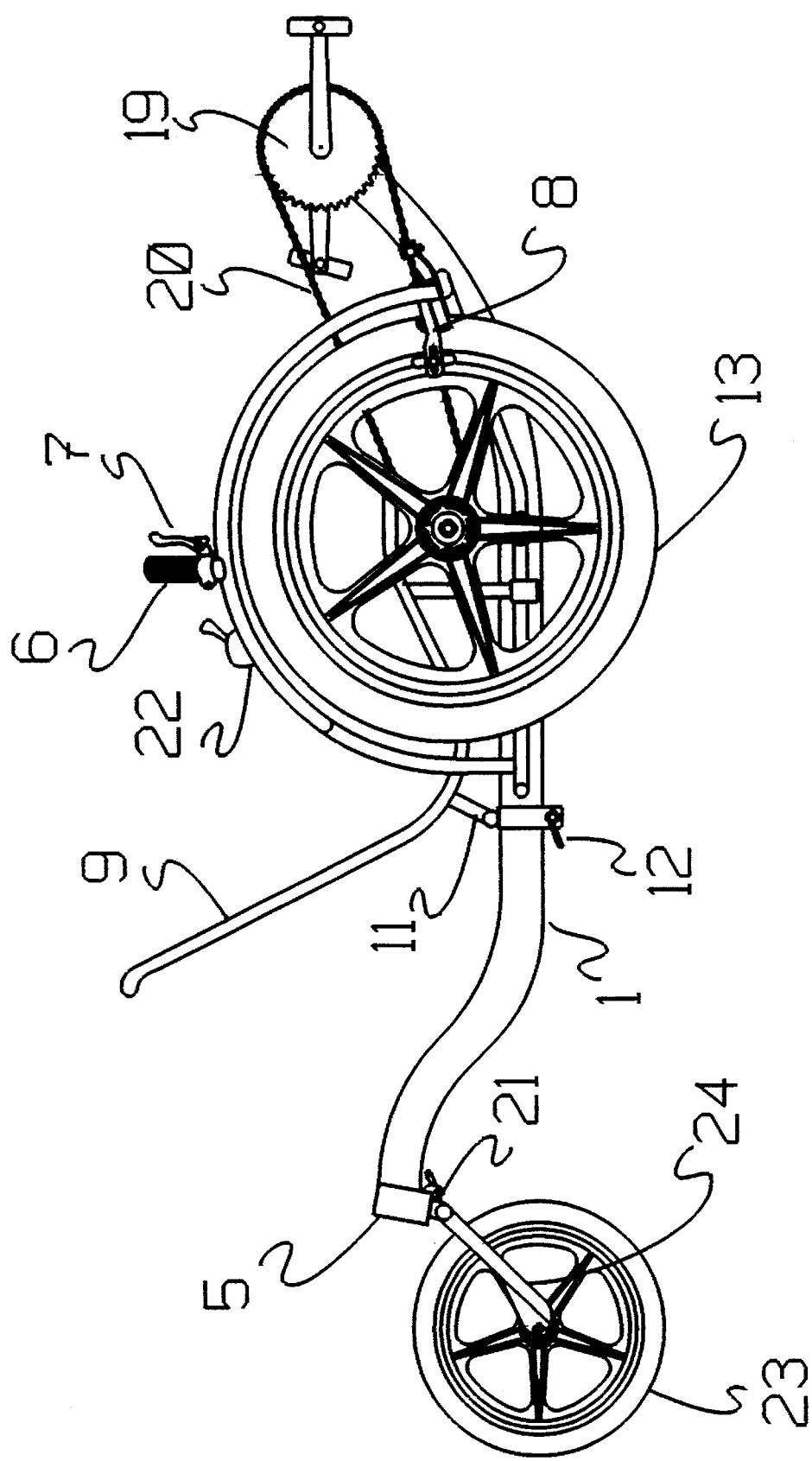
FIG. 1 is an orthographic side view, taken in elevation of the current invention.
Figure 2:
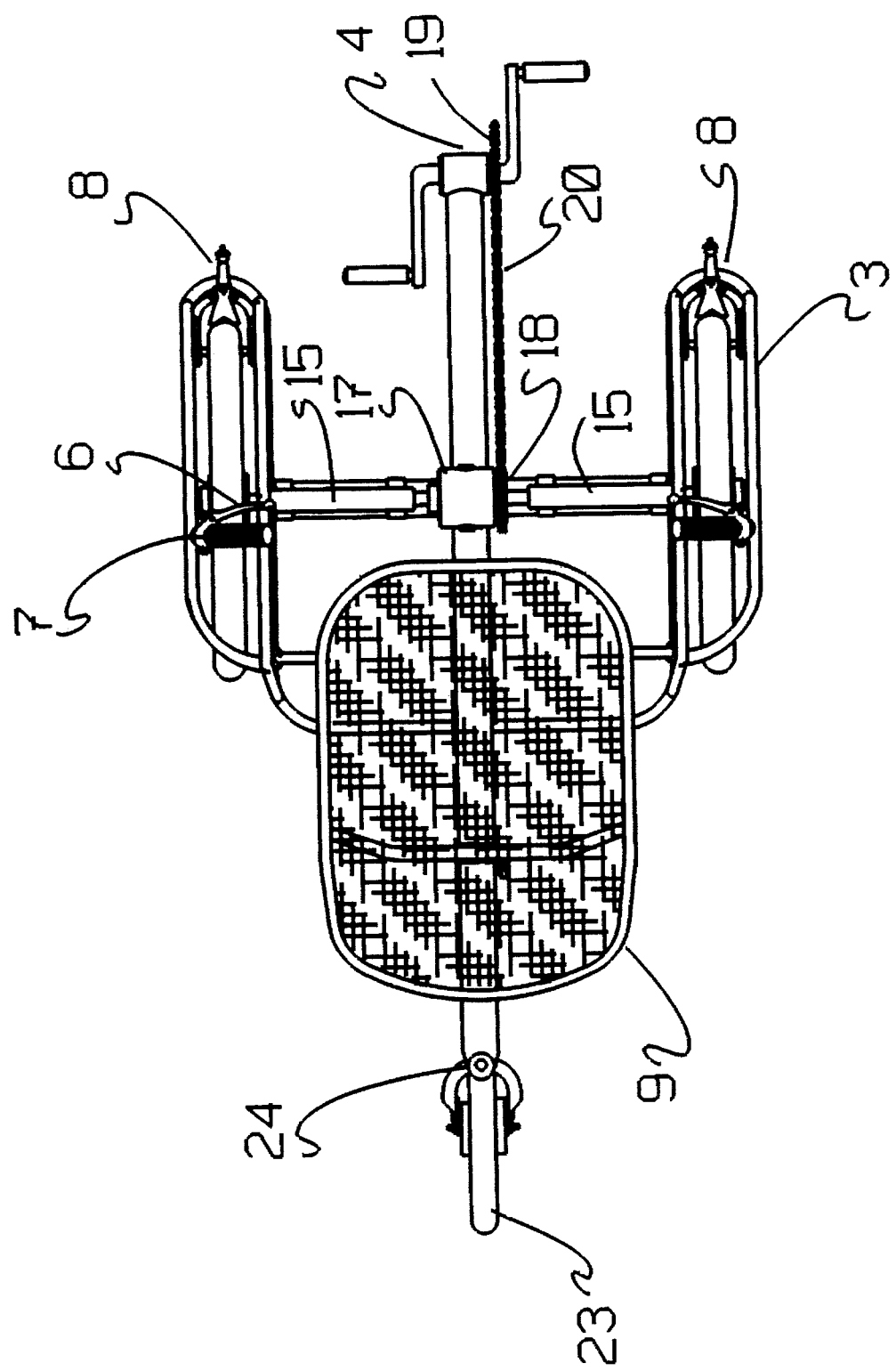
FIG. 2 is an orthographic top view of the current invention.
Figure 3:
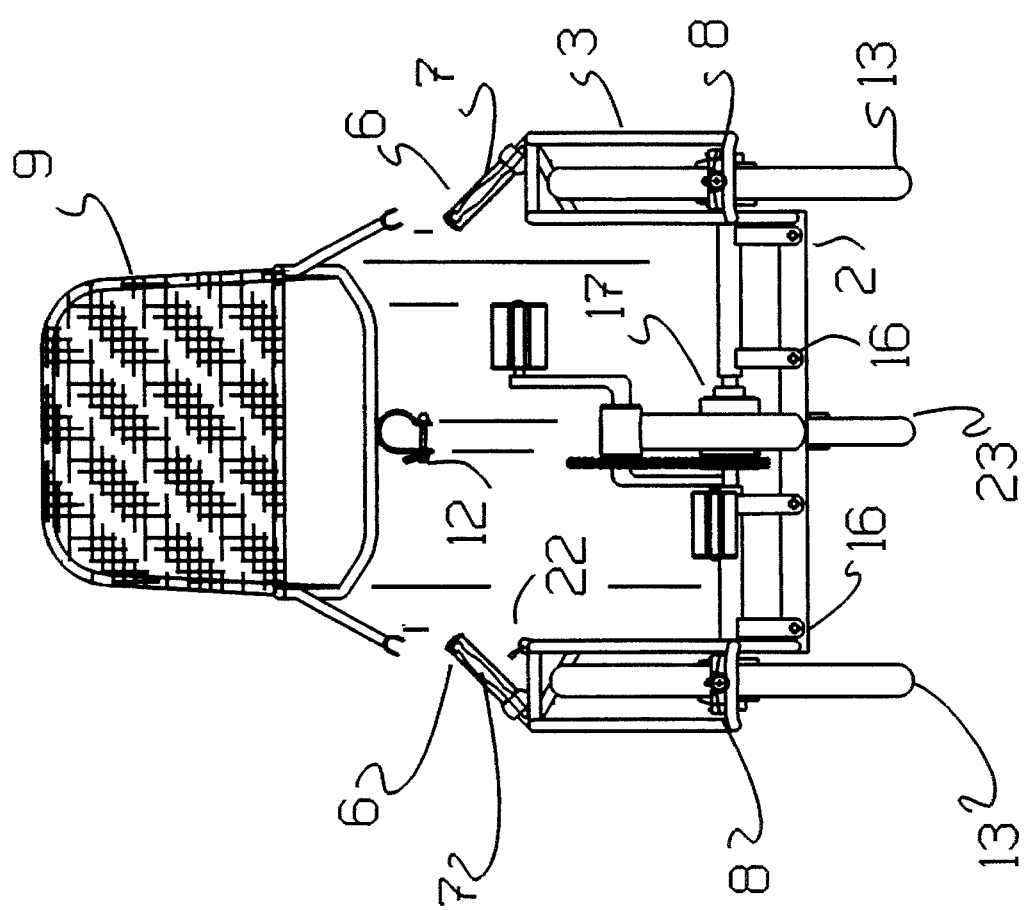
FIG. 3 is an orthographic front view of the current invention.

With reference to the drawings, and in particular to FIGS. 1 to 3 thereof, a new and improved tricycle apparatus embracing the principles and concepts of this invention will be described.

FIGS. 1, 2 and 3 collectively show the physical structure of this invention and the embodiment and organization of components. FIGS. 1 and 2 show the main frame structure, a formed tube backbone 1 with a crank housing 4 at the leading terminus and a caster housing 5 at the trailing terminus of the frame backbone. Cross frame member 2 is straight length tube connected to the backbone with the length of the cross frame 2 being perpendicular to the length of the backbone 1. FIGS. 2 and 3 show the bottom frame 3 which is of smaller diameter tube and is formed into the inner and outer wheel guards 3. Outer wheel guards 3 provide the mounting surface for the hand grips 6 and brake handles 7 which are mounted one on each wheel guard and individually operate a friction brake 8 on each wheel. Brake handles 7 are connected to the friction brake 8 by ubiquitous brake cable.

The operator's seat is a fabric or composite covering over a closed tube frame 9 and is support by sliding side stands 10 on each side of the bottom frame 3. Seat bottom support 11 runs from the side of the seat frame 9 to a seat bottom support slide lock 12 which provides lateral adjustment to the seat to peddle distance to accommodate operators of different physical height.

Drive wheels 13 are fixed to the ends of the drive axles 14 forming a right and left hand drive wheel assembly. Each drive axle is supported by a drive axle support 15 containing bearings which in turn is attached to the cross frame member 2 by two drive axle support brackets 16 on each drive wheel assembly. The drive wheel axles 14 are joined in a differential 17. Free wheel assembly sprocket 18 is mounted to one side of the differential 17. As power is applied through the peddles on the bell crank to the drive sprocket 19, power is transferred by the drive chain 20 to the free wheel sprocket on the differential 17. When pressure is applied to the friction brakes 8 causing either of the drive wheels 13 to lock, the differential 17 causes the free drive wheel 13 to turn twice as fast. By varying the pressure applied to the braking wheel 13 varying degrees of speed is transferred to the free wheel in turn causing varying degrees of turning of the tricycle about the braked wheel 13. This application of a differential 15 provides an extremely maneuverable tricycle with predictable result.

Caster wheel 23 is mounted in a caster wheel fork 24 and attached to the frame backbone 1 in a manner to permit free rotation in response to the drive wheel steering herein described. Allowing for varying degrees of operator skill and for use in settings where less maneuverability is desired, a maneuverability sensitivity control comprised of a friction device 21 operating on the caster wheel fork 24 and controlled by the operator by connected cable to a maneuverability dampening lever 22. The operator can at any time adjust the dampening effect by moving the lever 22, which in turn increases or decreases the maneuverability dampening on the steering by the friction device 21. In the most relaxed setting there is no dampening affect on the steering. In the maximum dampening position, the tricycle will tend to follow a straight forward line. Varying the application of dampening will effectively control the sensitivity of the tricycle to turning for a given amount of braking pressure.

The foregoing illustrates only the principles of the invention. Since modification and change will readily occur, it is not desired to limit the invention to the exact construction and operation shown and described herein. Accordingly, all suitable modifications and equivalents are within the scope of this invention.

Having described the invention and the manner in which it may be used, what is claimed as being new and desired to be protected by a PATENT of the United States is as follows:

1. A recumbent tricycle apparatus comprising:

a frame;

a crank assembly mounted on said frame;

a pair of drive wheels mounted on a pair of drive axles;

said drive axles being rotatably mounted to said frame;

a differential interconnecting said drive axles and having a free wheel sprocket;

a drive chain interconnecting said crank assembly and said free wheel sprocket; and a caster wheel rotatably mounted to a rear portion of the frame.

2. The recumbent tricycle of claim 1, further comprising a pair of drive wheel brakes mounted on the frame and adapted to independently brake each drive wheel.

3. The recumbent tricycle of claim 1, including a seat adjustably mounted to said frame for longitudinal movement relative to said frame.

4. The recumbent tricycle of claim 1, including a variable friction damper mounted to said caster wheel for variably damping rotation of said caster wheel about a substantially vertical axis.

* * * * *